(12) United States Patent
Hultberg

(10) Patent No.: US 7,977,291 B2
(45) Date of Patent: Jul. 12, 2011

(54) GRAFFITI REMOVAL MATERIALS AND METHODS

(76) Inventor: Chuck Hultberg, Upland, CA (US)

( * ) Notice: Subject to any disclaimer, the term of this patent is extended or adjusted under 35 U.S.C. 154(b) by 0 days.

(21) Appl. No.: 12/466,006

(22) Filed: May 14, 2009

(65) Prior Publication Data

US 2010/0292119 A1  Nov. 18, 2010

(51) Int. Cl.
*C11D 9/00* (2006.01)
*B08B 7/00* (2006.01)
(52) U.S. Cl. .............................. 510/174; 134/4; 134/38
(58) Field of Classification Search .................. 510/174; 134/4, 38
See application file for complete search history.

(56) References Cited

U.S. PATENT DOCUMENTS

| | | | |
|---|---|---|---|
| 2,438,038 A * | 3/1948 | Craver ............................ | 134/38 |
| 4,619,711 A * | 10/1986 | Olbrueck et al. ................ | 134/38 |
| 4,836,950 A * | 6/1989 | Madsen et al. ................. | 510/170 |
| 5,024,780 A | 6/1991 | Leys | |
| 5,346,640 A | 9/1994 | Leys | |
| 5,629,277 A | 5/1997 | Plishka | |
| 5,712,234 A | 1/1998 | Pourreau | |
| 5,773,091 A | 6/1998 | Perlman | |
| 5,929,005 A | 7/1999 | Smith | |
| 6,057,276 A | 5/2000 | Smith et al. | |
| 6,150,318 A * | 11/2000 | Silvester et al. ............... | 510/284 |
| 6,183,567 B1 | 2/2001 | Kamijo et al. | |
| 6,974,605 B2 | 12/2005 | Macris et al. | |
| 7,468,345 B2 | 12/2008 | Decker et al. | |
| 2003/0228997 A1 * | 12/2003 | Doyel et al. ................... | 510/410 |
| 2007/0049510 A1 * | 3/2007 | Fujii et al. ..................... | 510/201 |

\* cited by examiner

*Primary Examiner* — Milton I Cano
*Assistant Examiner* — Thuy-Ai N Nguyen
(74) *Attorney, Agent, or Firm* — Sandra P. Thompson; Buchalter Nemer

(57) ABSTRACT

Graffiti removal compositions has been developed and are disclosed that when coupled with reliable methods: a) consistently removes graffiti and other unwanted or undesirable paint, inks or permanent markers from a surface, b) is packaged such that it is easily transported, c) is easy to use and requires no additional on-site additives or special equipment, and d) utilizes less harmful chemicals and lower concentrations of chemicals that may be considered harmful. Graffiti removal compositions are described that include: at least one alcohol-based compound, at least one aromatic compound, at least one halogenated compound, at least one hydrocarbon; and at least one lactam-based compound.

6 Claims, No Drawings

GRAFFITI REMOVAL MATERIALS AND METHODS

FIELD OF THE SUBJECT MATTER

Materials and methods are described that relate to the removal of paint and paint-like compositions from a variety of surfaces, including metal, concrete, asphalt, stucco and any other surface where the composition isn't desired.

BACKGROUND

Although graffiti may be considered an art form and an expression of the collective community, in many instances, graffiti is used to identify gang movements, communicate between gangs and/or to deface homes and businesses. As new paints, inks, markers and other pigmented compositions are developed, along with new surfaces and buildings constructed, removal materials and methods must evolve. Graffiti removal materials tend to fall into two categories: a) those materials that rely on the chemical formulation to remove a majority of the graffiti or b) those materials that rely on the method of use to remove a majority of the graffiti.

U.S. Pat. No. 7,468,345 issued to Decker discloses a graffiti cleaning solution that includes a non-aqueous concentrate that can be shipped in concentrated form, diluted with water and utilized without degradation of the components in the concentrate. The concentrate is shipped in smaller containers and diluted according to the need of the user. These concentrates, as mentioned, are designed to be diluted with water, which could be problematic in developing countries and in urban areas where water may not be readily available. In addition, as clean water becomes more of a scarce resource such that its use is being highly regulated in suburban areas, it is not advantageous to use water in such a manner.

U.S. Pat. No. 6,974,605 issued to Macris et al. discloses both a protective composition and a removal material designed to remove graffiti. The cleaners disclosed therein comprise at least fifty percent of N-methyl pyrrolidone a versatile but toxic substance. It has recently been listed as a reproductive toxicant and many manufacturers are looking for alternative components to use in its place.

U.S. Pat. No. 6,057,276 issued to Smith discloses a material for removing graffiti whereby a particulate filler is utilized to initially contain the primary solvent and then allow the solvent to be slowly released after the material is applied to a surface. The slow release of solvent is important in order to give the solvent time to dissolve the graffiti or other undesirable paint product.

U.S. Pat. No. 6,183,567 issued to Kamijo discloses a method of removing graffiti whereby a treated material is placed over the graffiti, the graffiti is transferred to the treated material, and the treated material is removed from the surface and discarded. In this patent, the method is just as important as the material used to remove graffiti, in that it isn't clear if the material could function on its own without the release method. In addition, once the method is complete, the user is left with the treated material/graffiti unit that must be properly discarded. Given that this unit may comprise harmful materials, it is not clear that it could merely be thrown away, but it may instead need to be disposed of according to regulations set up by the US Environmental Protection Agency or other similar agencies outside of the US.

Therefore, it would be ideal to develop a graffiti removal material coupled with reliable methods that a) consistently removes graffiti and other unwanted or undesirable paint, inks or permanent markers from a surface, b) is packaged such that it is easily transported, c) is easy to use and requires no additional on-site additives or special equipment, and d) utilizes less harmful chemicals and lower concentrations of chemicals that may be considered harmful.

SUMMARY OF THE SUBJECT MATTER

Graffiti removal compositions has been developed and are disclosed that when coupled with reliable methods: a) consistently removes graffiti and other unwanted or undesirable paint, inks or permanent markers from a surface, b) is packaged such that it is easily transported, c) is easy to use and requires no additional on-site additives or special equipment, and d) utilizes less harmful chemicals and lower concentrations of chemicals that may be considered harmful.

Graffiti removal compositions are described that include: at least one alcohol-based compound, at least one aromatic compound, at least one halogenated compound, at least one hydrocarbon; and at least one lactam-based compound.

Contemplated graffiti removal compositions include about 9 weight percent of methyl alcohol and diethylene glycol; about 1 weight percent of toluene; about 57.5 weight percent of methylene chloride and chlorinated paraffin; about 30 weight percent of isobutane and propane; and about 0.5 weight percent of N-methyl-2-pyrrolidone.

Other contemplated graffiti removal compositions include about 7.6 weight percent of methyl alcohol; about 1.6 weight percent of diethylene glycol; about 56 weight percent of methylene chloride; about 1.5 weight percent of chlorinated paraffin; about 30 weight percent of isobutane and propane; and about 1.1 weight percent of N-methyl-2-pyrrolidone.

DETAILED DESCRIPTION

Surprisingly, a graffiti removal composition has been developed that when coupled with reliable methods: a) consistently removes graffiti and other unwanted or undesirable paint, inks or permanent markers from a surface, b) is packaged such that it is easily transported, c) is easy to use and requires no additional on-site additives or special equipment, and d) utilizes less harmful chemicals and lower concentrations of chemicals that may be considered harmful. Contemplated graffiti removal compositions are designed so that they can be used by everyone, including city maintenance workers and homeowners, without any special additives, mixing instructions or additional materials. These graffiti removal compositions may also be used to remove grease, oil and other lubricant-type of materials.

Contemplated graffiti removal materials comprise a series of components, including at least one alcohol-based compound, at least one aromatic compound, at least one halogenated compound, at least one hydrocarbon and at least one lactam-based compound. The combination of components are designed to both remove graffiti and unwanted inks, lubricants, paints and markers, while at the same time providing propellant or aerosol properties to the materials when stored in a suitable container.

Contemplated graffiti removal compositions have been developed that comprise at least one alcohol-based compound, at least one aromatic compound, at least one halogenated compound, at least one hydrocarbon compound and at least one lactam-based compound. These components may be present in the composition in any suitable amount based on the goals described earlier.

In some embodiments, the at least one alcohol-based compound comprises methyl alcohol, diethylene glycol or a combination thereof. In contemplated embodiments, the at least one alcohol-based compound is present in the composition in an amount of at least about 5 weight percent. If there is more than one alcohol-based compound present in the composition, then the total weight percent of the components is at least about 5 weight percent. Each of the alcohol-based components may or may not be present in equal amounts. For example, the composition may comprise methyl alcohol in an amount of 7.6 weight percent and may also comprise diethylene glycol in an amount of 1.6 weight percent. The total amount is at least about 5 weight percent, and is in fact in this example, 9.2 weight percent.

In contemplated embodiments, the at least one aromatic compound comprises toluene. In contemplated embodiments, the at least one aromatic compound is present in the composition in an amount of at least about 1 weight percent. If there is more than one aromatic compound present in the composition, then the total weight percent of the components is at least about 1 weight percent. Each of the aromatic components may or may not be present in equal amounts.

In contemplated embodiments, the at least one halogenated compound comprises chlorine. In some embodiments, the at least one halogenated compound comprises methylene chloride, chlorinated paraffin or a combination thereof. In contemplated embodiments, the at least one halogenated compound is present in the composition in an amount of at least about 50 weight percent. If there is more than one halogenated compound present in the composition, then the total weight percent of the components is at least about 50 weight percent. Each of the halogenated components may or may not be present in equal amounts For example, the composition may comprise methylene chloride in an amount of 56 weight percent and may also comprise chlorinated paraffin in an amount of 1.5 weight percent. The total amount is at least about 50 weight percent, and is in fact in this example, 57.5 weight percent.

In contemplated embodiments, the at least one hydrocarbon comprises isobutane, propane or a combination thereof. In contemplated embodiments, the at least one hydrocarbon is present in the composition in an amount of at least about 20 weight percent. If there is more than one hydrocarbon present in the composition, then the total weight percent of the components is at least about 20 weight percent. In some embodiments, the total weight percent of the components may be about 30 weight percent. Each of the hydrocarbons may or may not be present in equal amounts.

In contemplated embodiments, the at least one lactam-based compound comprises N-methyl-2-pyrrolidone. In contemplated embodiments, the at least one lactam-based compound is present in the composition in an amount of at least about 0.5 weight percent. If there is more than one lactam-based compound present in the composition, then the total weight percent of the components is at least about 0.5 weight percent.

In contemplated embodiments, contemplated graffiti removal compositions comprise about 9 weight percent of methyl alcohol and diethylene glycol; about 1 weight percent of toluene; about 57.5 weight percent of methylene chloride and chlorinated paraffin; about 30 weight percent of isobutane and propane; and about 0.5 weight percent of N-methyl-2-pyrrolidone. In some contemplated embodiments, contemplated graffiti removal compositions comprise about 7.6 weight percent of methyl alcohol, about 1.6 weight percent of diethylene glycol; about 56 weight percent of methylene chloride; about 1.5 weight percent of chlorinated paraffin; about 30 weight percent of isobutane and propane; and about 1.1 weight percent of N-methyl-2-pyrrolidone.

Each of the components disclosed herein are blended to form a graffiti removal composition that can be put in any suitable container for transport and use. In contemplated embodiments, the composition is intended to be utilized in aerosol form, and therefore, the composition should be stored in an aerosol can or another container that can produce aerosol compositions, including providing suitable propellant materials or devices depending on the container, method of use and available materials.

In some embodiments, methods of preparing graffiti removal compositions comprise: providing at least one alcohol-based compound, providing at least one aromatic compound, providing at least one halogenated compound, providing at least one hydrocarbon; providing at least one lactam-based compound; and blending these components to form the composition. In yet other embodiments, the composition is added to a suitable container, such as an aerosol can, and in some embodiments, a suitable propellant is added to the container and/or composition.

When these contemplated compositions are formed, they can be used directly from the container to remove graffiti unwanted paint, inks, grease, oil and/or permanent markers. The power of the composition coupled with the delivery method of the targeted aerosol means that the user will not need additional additives or equipment to remove graffiti. These compositions are easy to use by both maintenance workers and homeowners without significant instruction or demonstration.

Thus, specific embodiments and methods of graffiti and other unwanted composition removal have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A graffiti removal composition, consisting of:
   about 9 weight percent of methyl alcohol and diethylene glycol;
   about 1 weight percent of toluene;
   about 57.5 weight percent of methylene chloride and chlorinated paraffin;
   about 30 weight percent of isobutane and propane; and
   about 0.5 weight percent of N-methyl-2-pyrrolidone.

2. A graffiti removal composition, consisting of:
   about 7.6 weight percent of methyl alcohol;
   about 1.6 weight percent of diethylene glycol;
   about 56 weight percent of methylene chloride;
   about 1.5 weight percent of chlorinated paraffin;
   about 30 weight percent of isobutane and propane; and
   about 1.1 weight percent of N-methyl-2-pyrrolidone.

3. The graffiti removal composition of claim 2, wherein the composition is an aerosol.

4. The graffiti removal composition of claim 2, wherein the composition is stored in an aerosol can.

5. A graffiti removal composition, consisting of:
   about 7.6 weight percent of methyl alcohol;
   about 1.6 weight percent of diethylene glycol;
   about 56 weight percent of methylene chloride;

about 1.5 weight percent of chlorinated paraffin;
about 30 weight percent of isobutane and propane;
about 1.1 weight percent of N-methyl-2-pyrrolidone; and
a propellant.

6. The graffiti removal composition of claim 5, wherein the composition is stored in an aerosol can.

* * * * *